Patented June 13, 1950

2,511,782

UNITED STATES PATENT OFFICE 2,511,782

WATER PASTE PAINTS

Betty O. Newman, Schenectady, N. Y., assignor to National Gypsum Company, Buffalo, N. Y., a corporation of Delaware No Drawing. Application November 14, 1947, Serial No. 786,165

1 Claim. (Cl. 106—146)

This invention relates to water paste paints and more particularly to a water thinned paste paint in which color variation or flashing is eliminated.

The widely used practice of a so called tape joint system for concealing joints of gypsum wallboard to produce smooth, seamless walls and ceilings ready for decoration has not been completely satisfactory in the past. In such a tape joint system it is the practice to fill the joint between boards with a cement of calcium caseinate or a similar material, press a perforated tape directly into the cement and allow the cement to dry. A second coat of cement is then applied to conceal the tape and is sanded after thoroughly drying.

If a water thinned paste paint is thereafter applied directly to the wall and joint an unsightly color variation occurs on the wallboard as compared with the cement. This color variation, or "flashing," is believed to be caused by the presence of casein precipitants formed by the action of various salts such as hydrated lime, alum, etc. found in the paper covering of the wallboard and in the tape joint cement. A second theory is that the flashing is caused by a variation in suction between the wallboard and the tape joint cement. Flashing is also noted when water thinned paste paints are applied directly to fresh lime putty walls. Again, it is theorized that the flashing is occasioned by an uneven distribution of calcium and magnesium salts in the finished wall.

The principal object of the present invention is to provide a water paste paint adapted to be letdown or thinned with water to provide a flowable paint and which is free from color variation when applied directly as a coating to surfaces which normally produce color variation when water thinned paste paints are applied directly thereto, such as gypsum wallboard or plaster walls.

Another object is to provide such a water thinnable paste paint which hardens on drying.

Another object is to provide such a non-flashing water paste paint which eliminates the need for priming the normally flash-producing surface to which the paint is applied.

It has been found that the incorporation of certain ingredients into water thinnable paste paints will eliminate such color variation or flashing and thereby the need for priming. These ingredients include any one or combination of a certain group of sugar derivatives, namely, organic tetra and pentahydroxy monobasic acids and their water soluble salts, preferably their sodium salts. Such acids and their sodium salts which have been found satisfactory are gluconic acid, sodium gluconate, arabonic acid, sodium arabonate, mannonic acid, sodium mannonoate, gulonic acid, sodium gulonate, galactonic acid, sodium galactonate, talonic acid and sodium talonate. The manner in which any of these added ingredients affects the paint or the base surface to eliminate the flashing is not known to the inventor. As referred to in the appended claim, the various acids, i. e., gluconic, arabonic, mannonic, gulonic, galactonic and talonic, are intended to include their corresponding water soluble salts, since the form in which the acid radical will appear in the paste paint will depend chiefly on the pH of the paste paint and on any alkaline agents present therein.

The following are preferred examples of compositions embodying the present invention and are to be considered illustrative and not limitative.

Emulsion paste paint

| Ingredient: | Pounds |
| --- | --- |
| Varnish | 200 |
| Peptized casein | 75 |
| Prime white pigments | 650 |
| Fillers | 400 |
| Water | 700 |
| Sodium gluconate | 40 |

The varnish used can be either of the two types of varnish, namely, the oleoresinous type or the spirit type.

Casein paste paint

| Ingredient: | Pounds |
| --- | --- |
| Casein and alkaline solvents | 65 |
| Prime white pigments | 400 |
| Fillers | 200 |
| Water | 325 |
| Sodium gluconate | 20 |

It has been found, however, that sodium gluconate or any other of the above sugar derivatives may be added to any water thinnable paste paint formula in the proportion of from about one to five percent by weight to achieve the non-flashing characteristic. When more than five percent of sodium gluconate or the like is added, the paint will revert back to a flashing characteristic.

I claim:

A non-flashing water thinnable casein paste paint consisting essentially of peptized casein, pigments, fillers, water and from about 1 to 5% by weight of a sugar derivative selected from a group consisting of gluconic, arabonic, mannonic, gulonic, galactonic and talonic acids.

BETTY O. NEWMAN.

REFERENCES CITED

The following references are of record in the file of this patent:

UNITED STATES PATENTS

| Number | Name | Date |
|---|---|---|
| 2,279,387 | Cheetham et al. | Apr. 14, 1942 |
| 2,379,402 | Scholz et al. | June 26, 1945 |
| 2,468,633 | Lauderman | Apr. 26, 1949 |

OTHER REFERENCES

Chemical Abstracts, vol. 23, 1929, pages 3388–3389 (abstract of Krantz et al. article from Colloid Symposium, Monograph 6 (1928), pp. 173–206).